(12) United States Patent
Huang

(10) Patent No.: US 12,520,936 B2
(45) Date of Patent: Jan. 13, 2026

(54) PORTABLE BRACKET

(71) Applicants: Shenzhen Lemore Marketing Consultancy Co., Ltd, Shenzhen (CN); Jiecong Li, Shenzhen (CN)

(72) Inventor: Chenglan Huang, Shenzhen (CN)

(73) Assignees: Shenzhen Lemore Marketing Consultancy Co., Ltd, Shenzhen (CN); Jiecong Li, Shenzhen (CN)

( * ) Notice: Subject to any disclaimer, the term of this patent is extended or adjusted under 35 U.S.C. 154(b) by 0 days.

(21) Appl. No.: 18/288,207

(22) PCT Filed: Apr. 25, 2022

(86) PCT No.: PCT/CN2022/089121
§ 371 (c)(1),
(2) Date: Oct. 25, 2023

(87) PCT Pub. No.: WO2022/228404
PCT Pub. Date: Nov. 3, 2022

(65) Prior Publication Data
US 2024/0215714 A1 Jul. 4, 2024

(30) Foreign Application Priority Data

Apr. 26, 2021 (CN) .......................... 202120877659.0
Apr. 26, 2021 (CN) .......................... 202120888512.1

(51) Int. Cl.
*A47B 23/04* (2006.01)
*F16M 11/38* (2006.01)
*H04M 1/04* (2006.01)

(52) U.S. Cl.
CPC .......... *A47B 23/044* (2013.01); *A47B 23/043* (2013.01); *F16M 11/38* (2013.01); *H04M 1/04* (2013.01)

(58) Field of Classification Search
CPC .......... A45C 2200/15; A45C 2011/003; A47B 23/044; A47B 23/043; F16M 11/38; H04M 1/04
(Continued)

(56) References Cited

U.S. PATENT DOCUMENTS 70,339 A * 10/1867 Krietz ..................... A47B 19/06
                                                                108/9
2,222,665 A * 11/1940 Hoenigsberg ........... A47F 5/112
                                                                248/459

(Continued)

FOREIGN PATENT DOCUMENTS

CN        203800678 U     8/2014
CN        204145016 U     2/2015
(Continued)

OTHER PUBLICATIONS

Translation of CN 209782045 (Year: 2019).*
Translation of CN 211779986 (Year: 2020).*

*Primary Examiner* — Taylor Morris
(74) *Attorney, Agent, or Firm* — IPro, PLLC; Na Xu

(57) ABSTRACT

Disclosed is a portable bracket, comprising: a first supporting plate, a second supporting plate, and a supporting body arranged between the first and second supporting plates. The supporting body is switched between an unfolding state and a folding state, when the supporting body is in the unfolding state, the first supporting plate is fixed on the second supporting plate at a predetermined included angle, and when the supporting body is in the folding state, the first supporting plate is attached to the second supporting plate. In the present invention, the first and second supporting plates support a mobile device, and a size of the predetermined included angle is adjusted and set. When this angle is 85° to 90°, a field of view of the supported mobile device is wide; therefore, users conveniently perform live broadcast (Continued)

activity. The present invention further has the characteristics of a small volume and convenient carrying.

16 Claims, 9 Drawing Sheets

(58) Field of Classification Search
USPC .......................................................... 248/454
See application file for complete search history.

(56) References Cited

U.S. PATENT DOCUMENTS

| | | | | |
|---|---|---|---|---|
| 2,784,929 | A * | 3/1957 | Diening | A47B 23/043 |
| | | | | 248/463 |
| 3,305,206 | A * | 2/1967 | Nichols | A47B 23/043 |
| | | | | 248/459 |
| 3,718,308 | A * | 2/1973 | Hainault | A47B 23/043 |
| | | | | 248/460 |
| 4,379,373 | A * | 4/1983 | Transport | G09F 1/06 |
| | | | | 40/750 |
| 6,568,543 | B1 * | 5/2003 | Schneider | A47B 65/00 |
| | | | | D19/34.1 |
| 7,281,698 | B2 * | 10/2007 | Patterson, Jr. | A45C 11/00 |
| | | | | 248/458 |
| 7,545,634 | B2 * | 6/2009 | Simonian | A45C 13/02 |
| | | | | 361/679.55 |
| 7,828,260 | B2 * | 11/2010 | Hauser | A47B 23/043 |
| | | | | 248/920 |
| 8,162,283 | B1 * | 4/2012 | Royz | H04M 1/04 |
| | | | | 248/455 |
| 8,282,065 | B1 * | 10/2012 | Stone | F16M 13/00 |
| | | | | 16/221 |
| 8,464,995 | B2 * | 6/2013 | Yang | F16M 13/00 |
| | | | | 248/455 |
| 8,544,639 | B2 * | 10/2013 | Yang | A45C 13/34 |
| | | | | 206/320 |
| 8,851,280 | B2 * | 10/2014 | Wen | A45C 11/00 |
| | | | | 206/320 |
| 8,910,915 | B2 * | 12/2014 | Wibby | A45C 13/005 |
| | | | | 248/459 |
| 8,919,544 | B2 * | 12/2014 | Lee | G06F 1/1656 |
| | | | | 206/45.24 |
| 8,925,722 | B2 * | 1/2015 | Poon | B65D 5/5206 |
| | | | | 206/45.24 |
| D733,150 | S * | 6/2015 | Sirichai | D14/440 |
| 9,095,194 | B2 * | 8/2015 | Hassett | G06F 1/1626 |
| 9,227,763 | B2 * | 1/2016 | Gengler | G06F 1/1632 |
| 9,287,917 | B1 * | 3/2016 | Tages | A45C 11/00 |
| 9,377,810 | B2 * | 6/2016 | Hishinuma | G06F 1/1613 |
| 9,456,674 | B2 * | 10/2016 | Huang | A45C 11/00 |
| 9,591,905 | B2 * | 3/2017 | Poon | F16M 11/041 |
| 9,872,560 | B2 * | 1/2018 | McGrane | A47B 23/04 |
| 9,918,534 | B2 * | 3/2018 | Säilä | A45C 13/1069 |
| 10,095,320 | B2 * | 10/2018 | Harms | G06F 3/023 |
| 10,113,691 | B2 * | 10/2018 | Grieve | F16M 13/06 |
| 10,623,037 | B2 * | 4/2020 | Stryker | H04B 1/3877 |
| 10,638,627 | B1 * | 4/2020 | Stime | F16M 11/10 |
| 10,806,043 | B2 * | 10/2020 | Lee | F16M 11/10 |
| 10,880,423 | B2 * | 12/2020 | Ajani | F16M 13/00 |
| 11,441,727 | B1 * | 9/2022 | Amundson | F16M 11/041 |
| 12,053,068 | B2 * | 8/2024 | Hsu | F16M 13/022 |
| 2012/0037047 | A1 * | 2/2012 | Moldovan | F16M 11/10 |
| | | | | 108/3 |
| 2012/0305739 | A1 * | 12/2012 | Huang | F16M 11/10 |
| | | | | 248/397 |
| 2013/0240704 | A1 * | 9/2013 | Andrews | F16M 11/38 |
| | | | | 248/454 |
| 2013/0284613 | A1 * | 10/2013 | Lee | G06F 1/1679 |
| | | | | 206/45.2 |
| 2013/0284866 | A1 * | 10/2013 | Lee | F16M 13/00 |
| | | | | 248/188.6 |
| 2015/0136933 | A1 | 5/2015 | Merzon | |
| 2016/0036479 | A1 * | 2/2016 | Lin | H04B 1/3888 |
| | | | | 455/575.8 |
| 2018/0146078 | A1 * | 5/2018 | Shin | H04B 1/3888 |
| 2020/0036825 | A1 * | 1/2020 | Cheswick | H04B 1/385 |
| 2020/0060420 | A1 * | 2/2020 | Hu | A47B 23/043 |
| 2020/0063915 | A1 * | 2/2020 | Lederer | F16M 13/04 |
| 2020/0097050 | A1 * | 3/2020 | Robinson | G06F 1/1681 |
| 2020/0208773 | A1 * | 7/2020 | Lin | H04B 1/3888 |
| 2020/0397105 | A1 * | 12/2020 | Kim | A45C 11/00 |
| 2021/0204695 | A1 * | 7/2021 | Lin | F16M 11/041 |
| 2022/0202179 | A1 * | 6/2022 | Lin | A47B 23/043 |
| 2024/0115039 | A1 * | 4/2024 | Huang | F16M 11/38 |
| 2025/0260760 | A1 * | 8/2025 | Schiff | H04M 1/04 |

FOREIGN PATENT DOCUMENTS

| | | | | |
|---|---|---|---|---|
| CN | 204215311 U | | 3/2015 | |
| CN | 208967423 U | | 6/2019 | |
| CN | 209570872 U | | 11/2019 | |
| CN | 209782045 U | * | 12/2019 | |
| CN | 210319212 U | | 4/2020 | |
| CN | 210444330 U | | 5/2020 | |
| CN | 211176103 U | * | 8/2020 | |
| CN | 211779986 U | * | 10/2020 | H04M 1/04 |
| CN | 212203763 U | | 12/2020 | |
| CN | 212617167 U | | 2/2021 | |
| CN | 212660197 U | | 3/2021 | |
| CN | 212909636 U | | 4/2021 | |
| CN | 112911045 A | * | 6/2021 | G06F 1/1656 |
| CN | 214535265 U | * | 10/2021 | |
| KR | 20140146466 A | * | 12/2014 | H04M 1/04 |

* cited by examiner

PORTABLE BRACKET

TECHNICAL FIELD

The present invention relates to the field of supporting devices, and in particular, to a portable bracket.

BACKGROUND

With the popularization of intelligent mobile devices, people use mobile devices frequently. In various use scenes, it is common for a user to operate a mobile device by hand, such as answering and making a call and watching a video. However, with increasing use time, users will feel soreness in their wrists and then need to place the mobile device in a reasonable position. Meanwhile, it is desirable for users to free their hands and perform other activities such as watching videos, video conferences, and live broadcasts when using the mobile device without having to hold the mobile device all the time. Therefore, there is a need to effectively solve this problem with a portable bracket.

SUMMARY

A main technical problem solved by the present invention is to provide a portable bracket to solve the problems in the conventional technology that the bracket is large in size and inconvenient to carry.

To solve the foregoing technical problem, a technical solution adopted by the present invention is to provide a portable bracket, comprising: a first supporting plate, a second supporting plate, and a supporting body arranged between the first supporting plate and the second supporting plate, wherein the supporting body can be switched between an unfolding state and a folding state, when the supporting body is in the unfolding state, the first supporting plate is fixed on the second supporting plate at a predetermined included angle, and when the supporting body is in the folding state, the first supporting plate is attached to the second supporting plate.

Preferably, the supporting body comprises an angle adjusting plate, the angle adjusting plate comprises a first adjusting combination plate connected to the first supporting plate, a second adjusting combination plate connected to the second supporting plate, and an adjusting supporting plate connected to the first adjusting combination plate and the second adjusting combination plate by a folding part, and the adjusting supporting plate is supported between the first supporting plate and the second supporting plate.

Preferably, the supporting body further comprises an angle limiting plate, the angle limiting plate comprises a first limiting combination plate connected to the first supporting plate, a second limiting combination plate connected to the second supporting plate, and a limiting supporting plate connected to the first limiting combination plate and the second limiting combination plate by a folding part, and the limiting supporting plate can be attached to the first limiting combination plate.

Preferably, the supporting body comprises one angle adjusting plate and one angle limiting plate.

Preferably, the supporting body comprises two angle adjusting plates and one angle limiting plate, and the angle limiting plate is positioned between the two angle adjusting plates.

Preferably, a surface of the first supporting plate and a surface of the second supporting plate are wrapped with protective films.

Preferably, a surface of the angle adjusting plate and a surface of the angle limiting plate are wrapped with protective films.

Preferably, the angle limiting plate is magnetic.

Preferably, the predetermined included angle is 85° to 90°.

Preferably, both the first supporting plate and the second supporting plate are in a square, rectangular, or circular shape.

The present invention has the following beneficial effects: a portable bracket is disclosed, which comprises: a first supporting plate, a second supporting plate, and a supporting body arranged between the first supporting plate and the second supporting plate, wherein the supporting body can be switched between an unfolding state and a folding state, when the supporting body is in the unfolding state, the first supporting plate is fixed on the second supporting plate at a predetermined included angle, and when the supporting body is in the folding state, the first supporting plate is attached to the second supporting plate. In the present invention, both the first supporting plate and the second supporting plate support a mobile device, and a size of the predetermined included angle may be adjusted and set. When the predetermined included angle is 85° to 90°, a field of view of the supported mobile device is wide; therefore, users conveniently perform live broadcast activity. The present invention further has the characteristics of a small volume and convenient carrying.

DETAILED DESCRIPTION OF EMBODIMENTS

Figure 1:
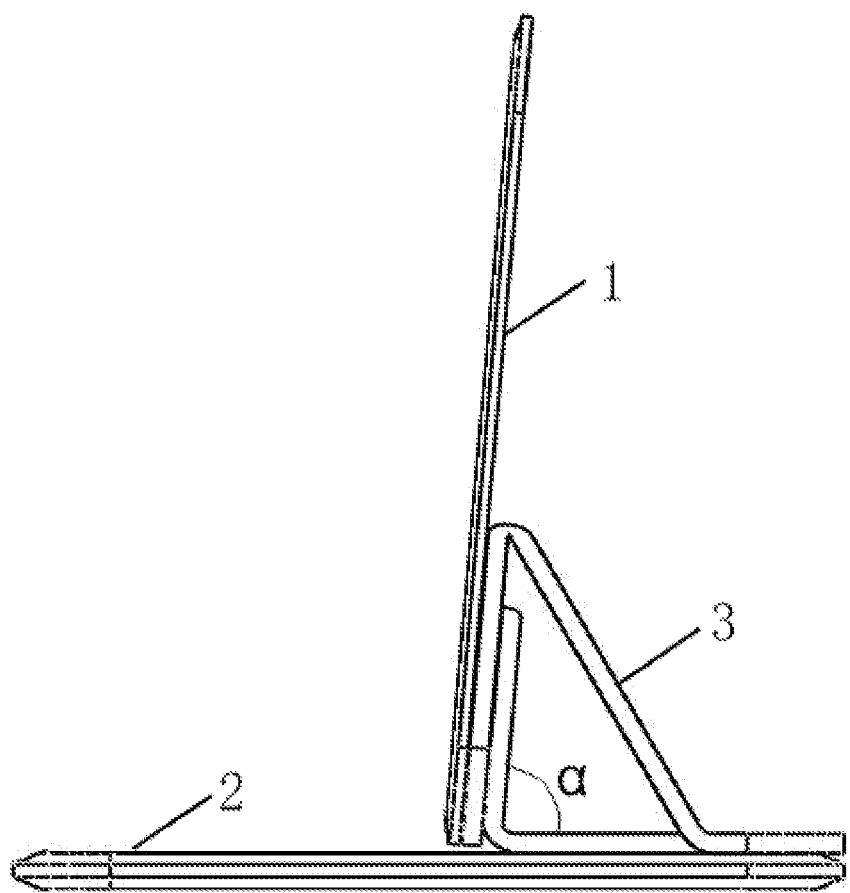
FIG. 1 is an unfolding schematic diagram of an embodiment of a portable bracket according to the present invention.

To facilitate understanding of the present invention, the present invention will be further described in detail below in conjunction with the accompanying drawings and specific embodiments. Preferred embodiments of the present invention are shown in the drawings. The present invention may, however, be embodied in many different forms and is not limited to the embodiments described herein. Rather, these embodiments are provided so that this disclosure of the present invention will be understood thoroughly and completely.

It should be noted that, unless otherwise defined, all technical and scientific terms used in this specification have the same meanings as those usually understood by those skilled in the art of the present invention. The terms used in the specification of the present invention are merely for the purpose of describing specific embodiments, and are not intended to limit the present invention. The term "and/or" as used in this specification includes any or all combinations of one or more related listed items.

Figure 2:
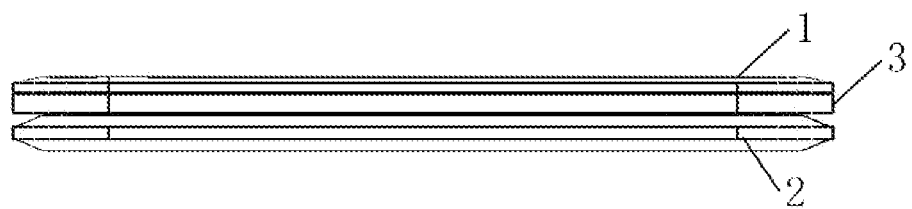
FIG. 2 is a folding schematic diagram of an embodiment of a portable bracket according to the present invention.

As shown in FIGS. 1 and 2, the portable bracket comprises: a first supporting plate 1, a second supporting plate 2, and a supporting body 3 arranged between the first supporting plate 1 and the second supporting plate 2. The supporting body 3 can be switched between an unfolding state and a folding state, when the supporting body 3 is in the unfolding state, the first supporting plate 1 is fixed on the second supporting plate 2 at a predetermined included angle α, and when the supporting body 3 is in the folding state, the first supporting plate 1 can be attached to the second supporting plate 2.

Preferably, the supporting body 3 comprises one angle adjusting plate and two angle limiting plates, and the angle adjusting plate is positioned between the two angle limiting plates, referring to a fourth embodiment of the present invention.

In the present invention, the first supporting plate 1 and the second supporting plate 2 may be made of non-metal materials such as fiberglass and plastics, and these materials have good hardness, or may be made of metal materials such as iron materials.

Preferably, the mobile device may be fixed on the first supporting plate 1 or the second supporting plate 2, for example, by fixing glue or touch fasteners. Alternatively, a protective shell of the mobile device is directly fixed on the first supporting plate 1 or the second supporting plate 2 of the portable bracket.

Preferably, the first supporting plate 1 and/or the second supporting plate 2 are magnetic, and may be a magnet or made of the foregoing material with a magnet block mounted thereon. The supporting plate can be adsorbed on the mobile device with a metal back panel, which is convenient for a user to carry, and has a small volume. For example, in the present invention, the first supporting plate 1 may be made of a metal material, and the second supporting plate 2 is magnetic, so that the first supporting plate 1 and the second supporting plate 2 can be attracted, and the second supporting plate 2 can also be adsorbed on a mobile device having a metal back panel. Of course, the second supporting plate 2 can be adsorbed on an object having a metal panel, such as a refrigerator and a metal wall surface, and a small object can be placed on the first supporting plate 1.

In the present invention, the mobile device refers to a mobile phone, a tablet computer, an MP4, a microcomputer and the like, and can be supported on an outer side surface of the first supporting plate 1.

This portable bracket plays a role in supporting and fixing mobile devices, allowing users to free their hands. In addition, the portable bracket can also be folded and stored when not in use; therefore, it is convenient to store and carry, is not easy to lose, and saves space.

Figure 3:
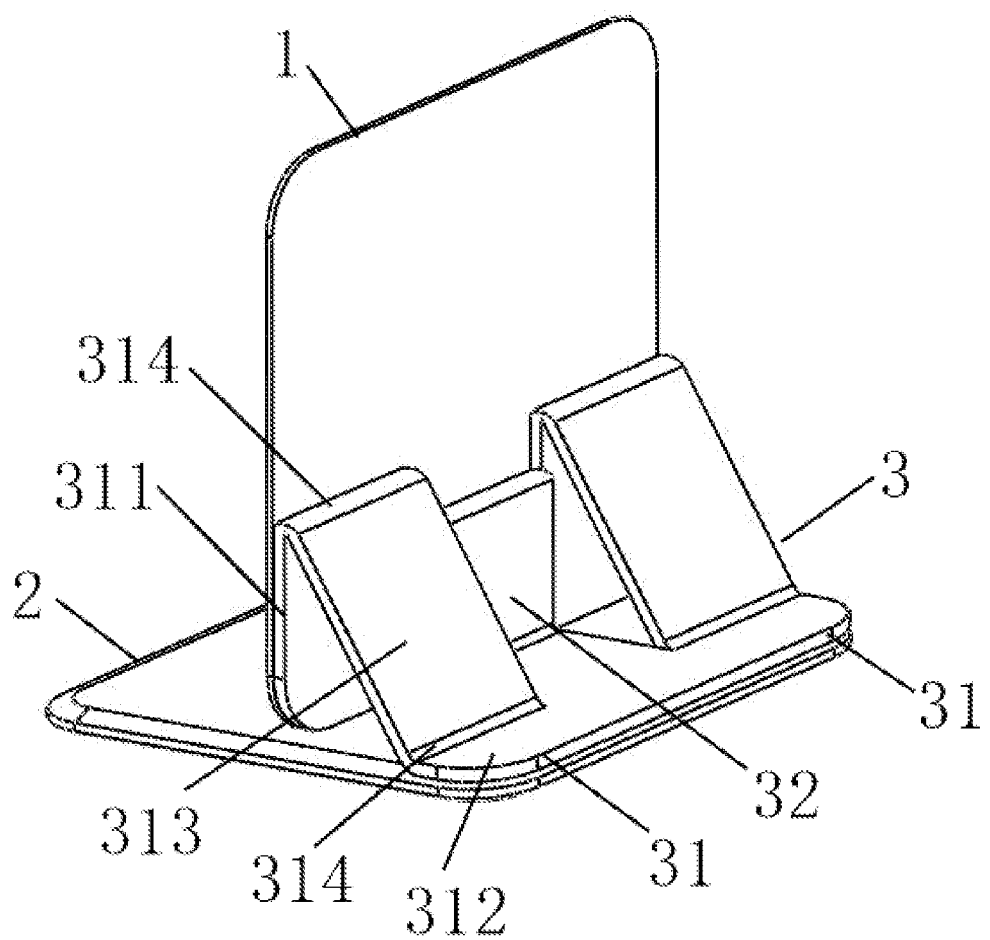
FIG. 3 is a schematic three-dimensional diagram of an embodiment of a portable bracket according to the present invention.

Further, as shown in FIG. 3, as a first embodiment of the present invention, the supporting body 3 comprises an angle adjusting plate 31, and the angle adjusting plate 31 has an overall shape of a strip. The angle adjusting plate 31 comprises a first adjusting combination plate 311 connected to the first supporting plate 1, a second adjusting combination plate 312 connected to the second supporting plate 2, and an adjusting supporting plate 313 connected to the first adjusting combination plate 311 and the second adjusting combination plate 312 by a folding part 314, and the adjusting supporting plate 131 is supported between the first supporting plate 1 and the second supporting plate 2.

In the present invention, a side surface that is of the first supporting plate 1 and that is opposite to the second supporting plate 2 is referred to as an inner side surface, and a side surface that faces away from the second supporting plate is referred to as an outer side surface. In this embodiment, a connection position between the first adjusting combination plate 311 and the first supporting plate 1 is at a left edge of the inner side surface of the first supporting plate 1, and a connection position between the second adjusting combination plate 312 and the second supporting plate 2 is at a right edge of the inner side surface of the second supporting plate 2. The adjusting supporting plate 313 between the first adjusting combination plate 311 and the second adjusting combination plate 312 can be turned over by a folding part 314.

When the portable bracket is in an initial state, the first supporting plate 1 and the second supporting plate 2 are attracted. When the portable bracket is used, the first supporting plate 1 needs to be lifted, the first adjusting combination plate 311 is lifted together with the first supporting plate 1, the adjusting supporting plate 313 is turned over by the folding part 4 and is tilted and supported between the first supporting plate 1 and the second supporting plate 2, and the second adjusting combination plate 312 is fixed on the second supporting plate 2 and remains stationary.

In this way, the first supporting plate 1 can be fixed on the second supporting plate 2 at a predetermined included angle α. Meanwhile, a size of the predetermined included angle α can be adjusted, that is, a position that is of the left edge of the first supporting plate 1 that abuts against the second supporting plate 2 determines the size of the predetermined included angle α. Specifically, When the left edge of the first supporting plate 1 moves to a left side, the predetermined included angle α becomes smaller, and when the left edge of the first supporting plate 1 moves to a right side, the predetermined included angle α becomes larger. Users can adjust the size of the predetermined included angle α according to their own usage habits. According to actual usage habits, a range of the predetermined included angle α is 0° to 90°. When the predetermined included angle α is 0°, the first supporting plate 1 and the second supporting plate 2 are attracted, and when the predetermined included angle α is 90°, the first supporting plate 1 is approximately vertical to the second supporting plate 2.

Figure 4:
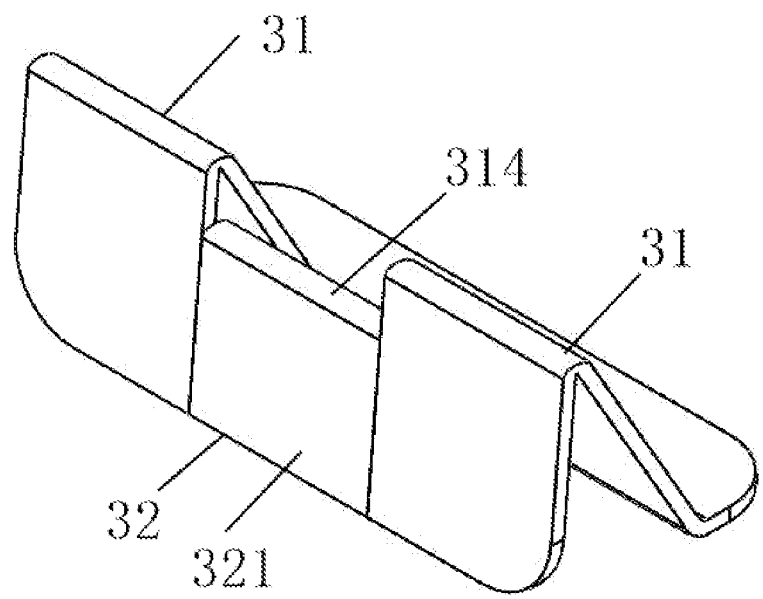
FIG. 4 is a schematic diagram of a supporting body of an embodiment of a portable bracket according to the present invention.
Figure 5:
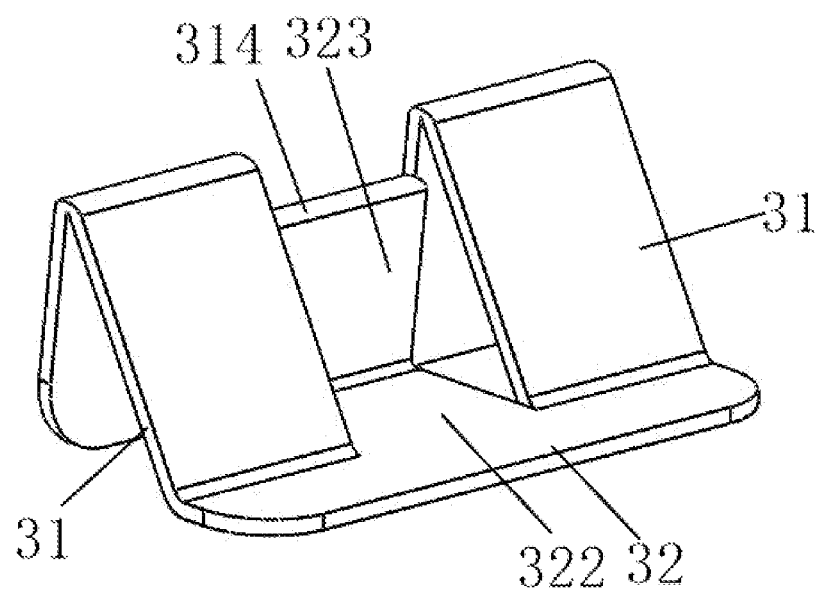
FIG. 5 is a schematic diagram of a supporting body of an embodiment of a portable bracket according to the present invention.

Further, with reference to FIGS. 4 and 5, as a second embodiment of the present invention, the supporting body 3 further comprises an angle limiting plate 32, and the angle limiting plate 32 has an overall shape of a strip. The angle limiting plate 32 comprises a first limiting combination plate 321 connected to the first supporting plate 1, a second limiting combination plate 322 connected to the second supporting plate 2, and a limiting supporting plate 323 connected to the first limiting combination plate 321 and the second limiting combination plate 322 by a folding part 314, and the limiting supporting plate 323 can be attached to the first limiting combination plate 321.

In this embodiment, a connection position between the first limiting combination plate 321 and the first supporting plate 1 is at a left edge of the inner side surface of the first supporting plate 1, and a connection position between the second limiting combination plate 322 and the second supporting plate 2 is at a right edge of the inner side surface of the second supporting plate 2. The limiting supporting plate 323 between the first limiting combination plate 321 and the second limiting combination plate 322 can be turned over by a folding part 314.

When the portable bracket is in an initial state, the first supporting plate 1 and the second supporting plate 2 are attracted. When the portable bracket is used, the first supporting plate 1 needs to be lifted, the first adjusting combination plate 311 and the first limiting combination plate 321 are lifted together with the first supporting plate 1, the adjusting supporting plate 313 and the limiting supporting plate 323 is turned over by the folding part 4 and are tilted and supported between the first supporting plate 1 and the second supporting plate 2, and the second adjusting combination plate 312 and the second limiting combination plate 322 are fixed on the second supporting plate 2 and remain stationary.

When the left edge of the first supporting plate 1 abuts against the folding part 314 that is close to the limiting supporting plate 323 and the first limiting combination plate 321, the limiting supporting plate 323 and the first limiting combination plate 321 are attracted.

This method restricts the left edge of the first supporting plate 1 from moving further to the right side, that is, restricts the size of the predetermined included angle α, but does not restrict the left edge of the first supporting plate 1 from moving to the left side, and the limiting supporting plate 323 can be separated from the first limiting combination plate 321 to facilitate the storage of the entire supporting body. In this embodiment, the predetermined included angle α is 85° to 90°, and the first supporting plate 1 is approximately vertical to the second supporting plate 2; the predetermined included angle α is set to 85° to 90°, when the mobile device (such as a smartphone) is adsorbed at the outer side surface of the first supporting plate 1, a front-facing camera of a mobile device has a wider viewing angle and a wider field of view, which can facilitate meetings, live broadcasts and other activities, and provide convenience for live broadcast recording.

It can be seen that, in this embodiment, the size of the predetermined included angle α depends on a length of the second limit combining plate 322 in a lateral direction, and the size of the predetermined included angle α can be adjusted by changing a size of the length of the second limiting combination plate 322.

Preferably, the angle limiting plate 32 is magnetic. The angle limiting plate 32 may be a magnet or made of a plate having a magnet block. Specifically, the limiting supporting plate 323 and the first limiting combination plate 321 are magnets capable of attracting each other. Alternatively, one of the limiting supporting plate 323 and the first limiting combination plate 321 is a magnet, and the other is made of metal, and the two can be attracted; a material of the second limiting combination plate 322 may be a magnet, a metal material, a glass fiber plate, and the like.

Similarly, the angle adjusting plate 31 may be magnetic.

Preferably, a surface of the first supporting plate 1 and a surface of the second supporting plate 2 are wrapped with protective films (not shown in the figures). The protective film provides protection for the first supporting plate 1 and the second supporting plate 2, and is more skin-friendly, thus improving the user experience.

Preferably, the protective film can be a soft film such as a leather material, a plastic film, a cloth, and DuPont paper.

Similarly, a surface of the angle adjusting plate 31 and a surface of the angle limiting plate 32 are wrapped with protective films. The first limiting combination plate 312, the limiting supporting plate 323 and the second limiting combination plate 322 are connected through the protective film to form a strip shape; and the first adjusting combination plate 311, the adjusting supporting plate 313, and the second adjusting combination plate 312 are connected to form a strip shape. The protective film between the first adjusting combination plate 311 and the adjusting supporting plate 313 is a folding part 314 and has a crease. The other same folding parts 314 are not described.

Referring to FIGS. 3 to 5, it can be seen that, in this embodiment, the supporting body comprises two angle adjusting plates 31 and one angle limiting plate 32, and the angle limiting plate 32 is positioned between the two angle adjusting plates 31. The angle adjusting plate 31 and the angle limiting plate 32 are both in a strip shape with a length and a width being basically the same.

Preferably, the first adjusting combination plate 311 and the first limiting combination plate 321 are separated, that is, the first adjusting combination plate 311 and the first limiting combination plate 321 are not affected by each other and are not connected.

Preferably, the first adjusting combination plate 311 and the first limiting combination plate 321 are integrally connected. That is, the first adjusting combination plate 311 and the first limiting combination plate 321 are integrated into a whole. In this embodiment, an overall shape of two first adjusting combination plates 311 and one first limiting combination plate 321 is concave.

Preferably, the second adjusting combination plate 312 and the first limiting combination plate 322 are separated, that is, the second adjusting combination plate 312 and the second limiting combination plate 322 are not affected by each other and are not connected.

Preferably, the second adjusting combination plate 312 and the second limiting combination plate 322 are integrally connected. That is, the second adjusting combination plate 312 and the second limiting combination plate 322 are integrated into a whole. In this embodiment, an overall shape of two second adjusting combination plates 312 and one second limiting combination plate 322 is convex.

The first adjusting combination plate 311 and the first limiting combination plate 321 are integrally connected, and the second adjusting combination plate 312 and the second limiting combination plate 322 are integrally connected, so that the supporting body 3 can be combined into an integral structure.

Further, as a third embodiment of the present invention, the supporting body 3 comprises one angle adjusting plate 31 and one angle limiting plate 32. The effect of supporting the first supporting plate 1 can be achieved by one angle adjusting plate 31 and one angle limiting plate 32. In this embodiment, a width of the angle adjusting plate 31 is preferably greater than that of the angle limiting plate 32, so that the first supporting plate 1 can be better supported.

Figure 6:
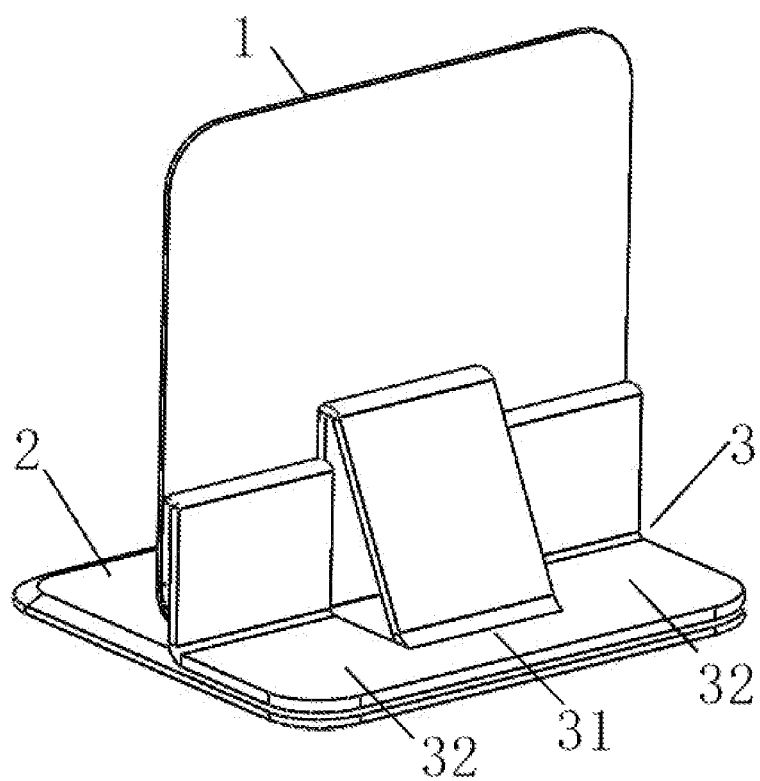
FIG. 6 is a schematic diagram of another embodiment of a portable bracket according to the present invention.

As shown in FIG. 6, as a fourth embodiment of the present invention, the supporting body comprises two angle limiting plates 32 and one angle adjusting plate 31, and the angle adjusting plate 31 is positioned between the two angle limiting plates 32. The size of the predetermined included angle α can be adjusted by the angle adjusting plate 31 at the middle, and the size of the predetermined included angle α is limited by the angle limiting plates 32 at two sides. The remaining same structures are not described in this embodiment.

Figure 7:
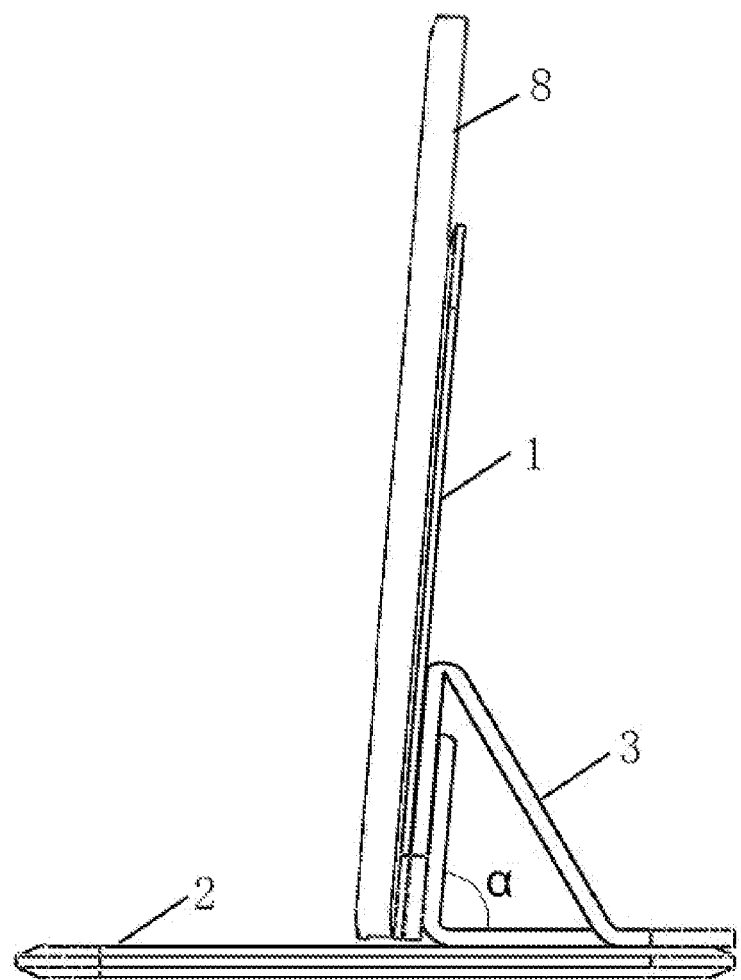
FIG. 7 is a schematic diagram of a portable bracket according to the present invention in a use state.

As shown in FIG. 7, the mobile device 8 may be adsorbed on the outer side surface of the first supporting plate 1, and the outer side surface of the second supporting plate 2 is placed on a plane. In this case, the predetermined included angle α is 85° to 90°, and the mobile device 8 is approximately vertical to the plane.

Figure 8:
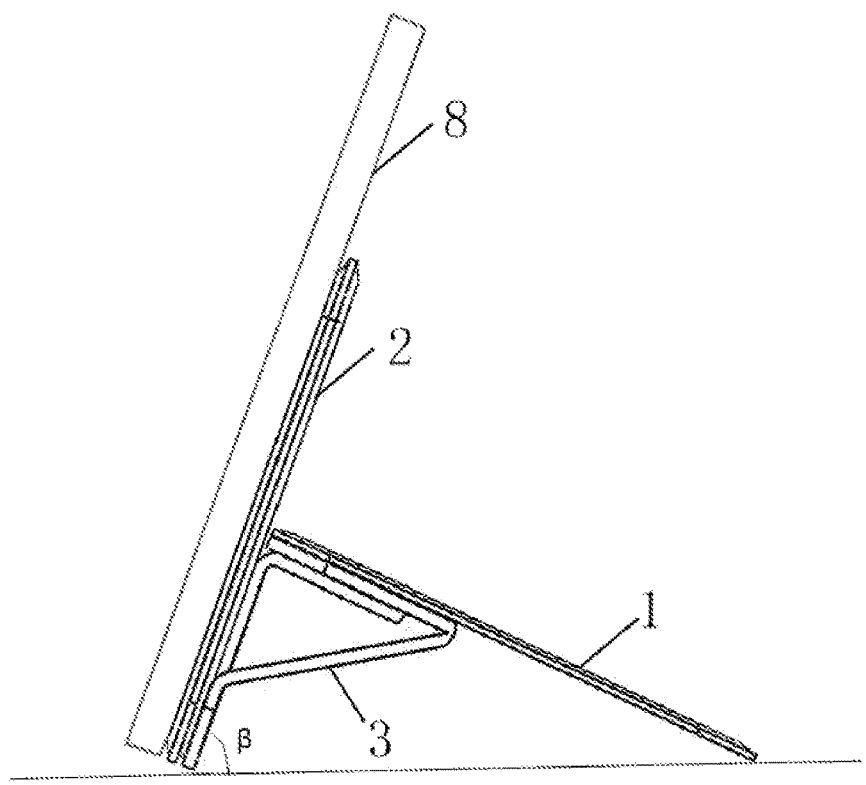
FIG. 8 is a schematic diagram of another embodiment of a portable bracket according to the present invention.

Further, as shown in FIG. 8, the mobile device 8 can also be adsorbed on the outer side surface of the second supporting plate 2, and an edge of the first supporting plate 1 and an edge of the second supporting plate 2 contact the plane; and in this case, an angle β between the mobile device 8 and the plane is 55° to 60°.

Preferably, with reference to the foregoing embodiments, both the first supporting plate 1 and the second supporting plate 2 are in a square shape, and the supporting body 3 is also in a square shape in the folding state.

Figure 9:
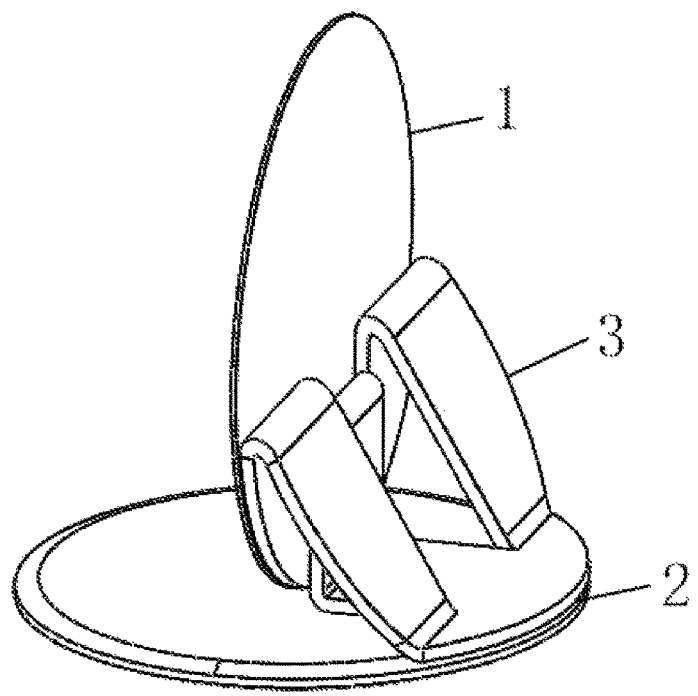
FIG. 9 is a schematic diagram of another embodiment of a portable bracket according to the present invention.

Preferably, with reference to FIG. 9, as a sixth embodiment of the present invention, both the first supporting plate 1 and the second supporting plate 2 are in a circular shape, and the supporting body 3 is also in a circular shape in the folding state. In this embodiment, the supporting body 3 comprises two angle adjusting plates 31 and one angle limiting plate 32, and the angle limiting plate 32 is positioned between the two angle adjusting plates 31.

Preferably, with reference to FIGS. 10 to 13, both the first supporting plate 1 and the second supporting plate 2 are in a rectangular shape. The supporting body 3 is also in a rectangular shape in the folding state.

Figure 10:
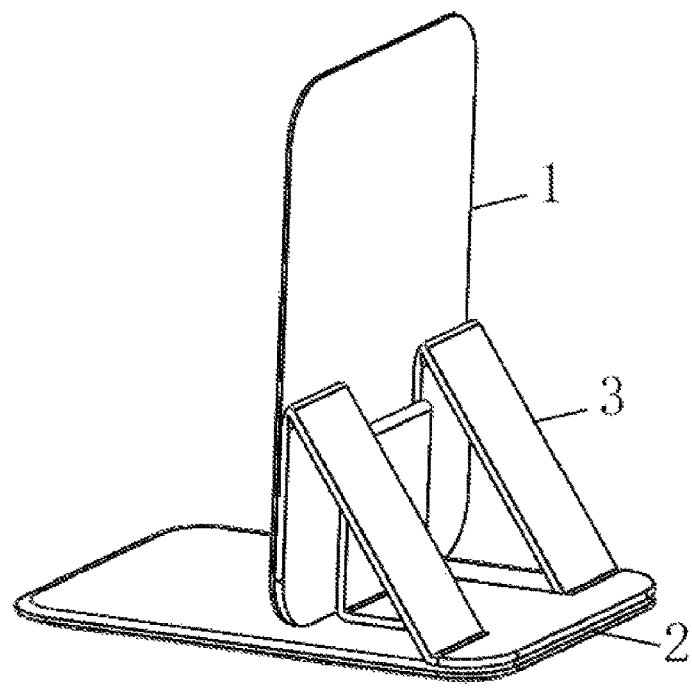
FIG. 10 is a schematic diagram of another embodiment of a portable bracket according to the present invention.
Figure 11:
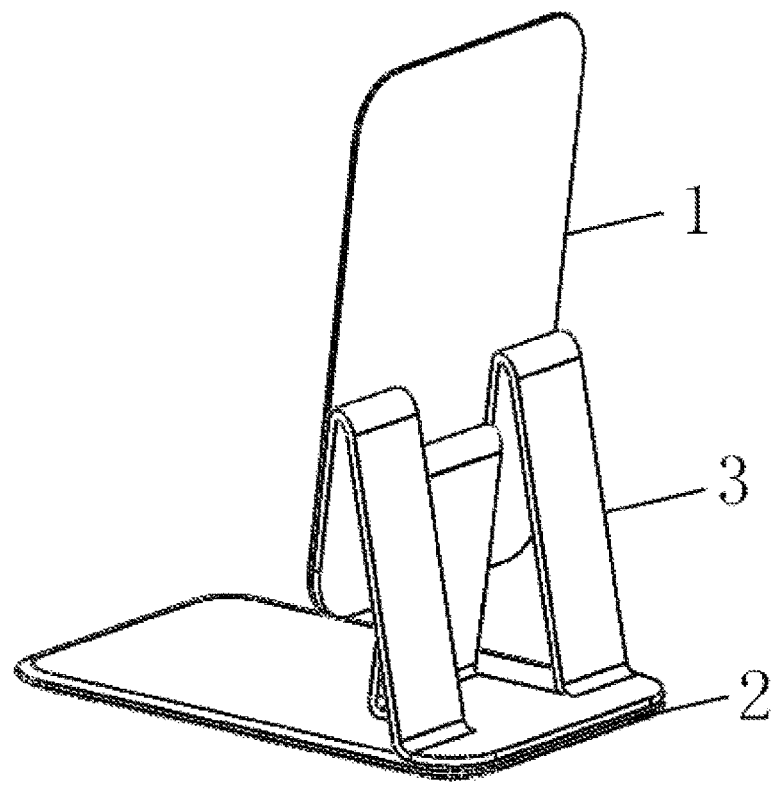
FIG. 11 is a schematic diagram of another embodiment of a portable bracket according to the present invention.

In FIGS. 10 and 11, the supporting body 3 comprises two angle adjusting plates 31 and one angle limiting plate 32, and the angle limiting plate 32 is positioned between the two angle adjusting plates 31.

Figure 12:
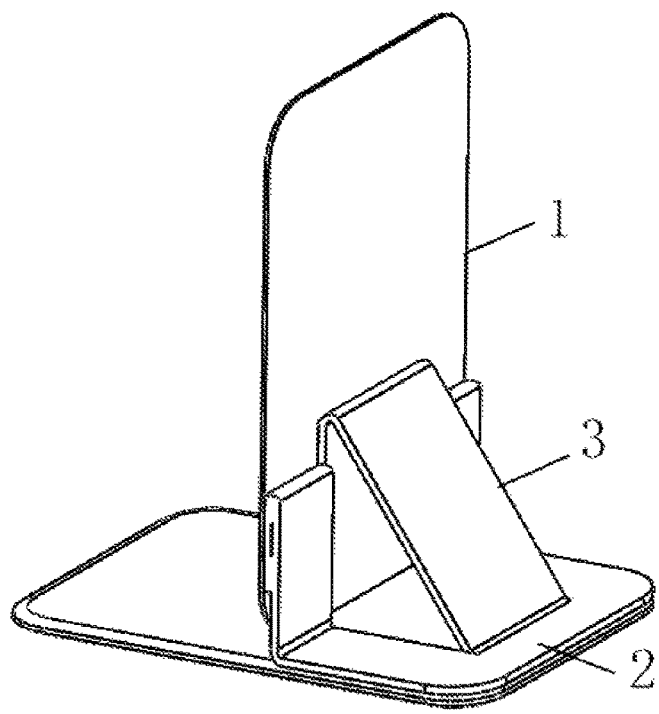
FIG. 12 is a schematic diagram of another embodiment of a portable bracket according to the present invention.
Figure 13:
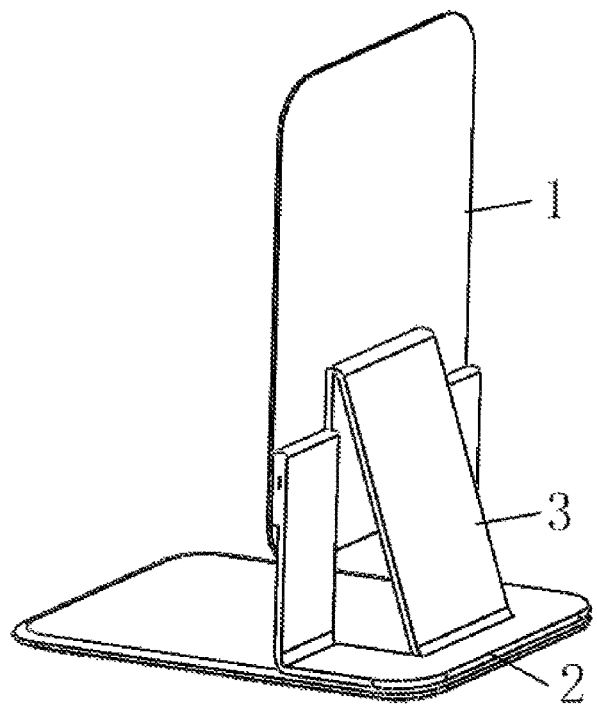
FIG. 13 is a schematic diagram of another embodiment of a portable bracket according to the present invention.

In FIGS. 12 and 13, the supporting body 3 comprises two angle limiting plates 32 and one angle adjusting plate 31, and the angle adjusting plate 31 is positioned between the two angle limiting plates 32.

Figure 14:
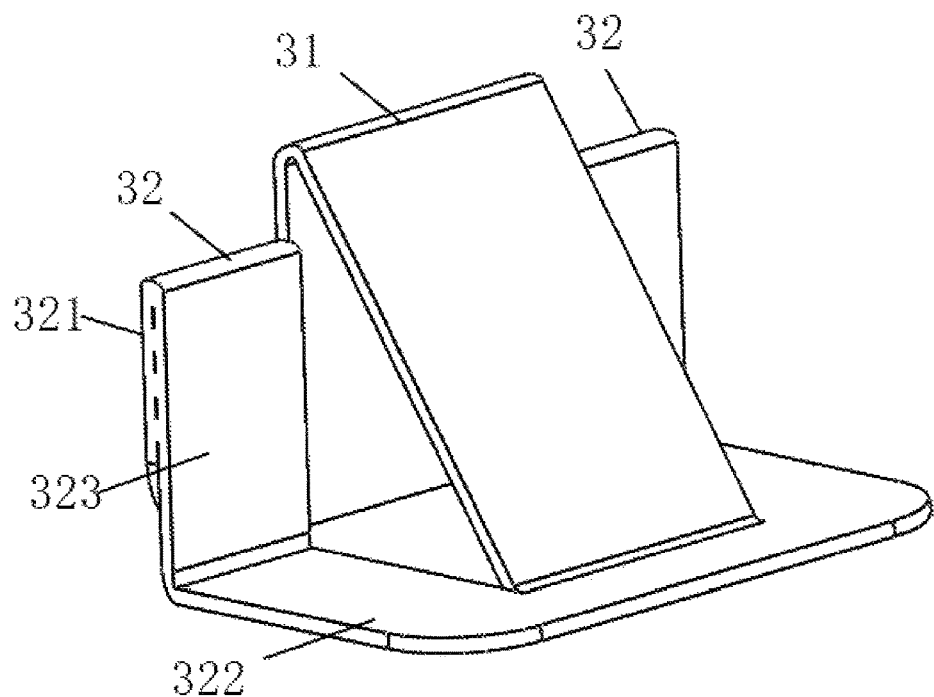
FIG. 14 is a schematic diagram of another embodiment of a supporting body in a portable bracket according to the present invention.
Figure 15:
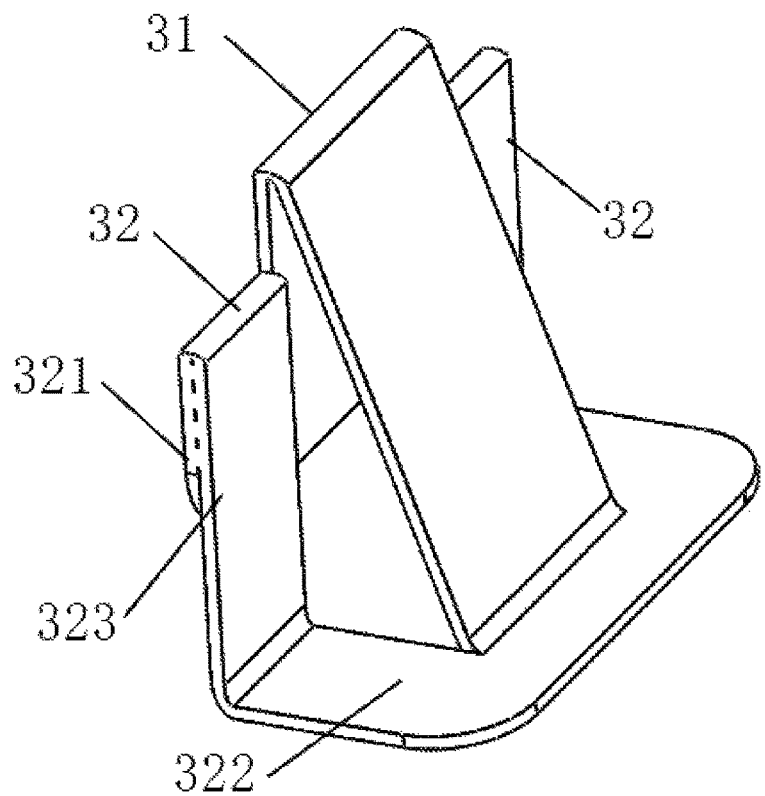
FIG. 15 is a schematic diagram of another embodiment of a supporting body in a portable bracket according to the present invention.

With reference to FIGS. 14 and 15, FIGS. 14 and 15 are schematic diagrams of the supporting body 3 in FIGS. 12 and 13, respectively. In FIG. 14, a length of the limiting supporting plate 323 is the same as that of the first limiting combination plate 312, and the limiting supporting plate may be completely attached to the first limiting combination plate. In this case, the left edge of the first supporting plate 1 may abut against the second supporting plate 2 or be close to the inner side surface of the second supporting plate 2.

In FIG. 15, a length of the limiting supporting plate 323 is greater than that of the first limiting combination plate 321, and the limiting supporting plate may be partially attached to the first limiting combination plate. In this case, the left edge of the first supporting plate 1 is at a certain height from the inner side surface of the second supporting plate 2. In this way, the supporting height of the mobile device 8 can be increased.

Similarly, in FIG. 10, a length of the limiting supporting plate is the same as that of the first limiting combination plate, and the limiting supporting plate may be completely attached to the first limiting combination plate. In FIG. 11, a length of the limiting supporting plate is greater than that of the first limiting combination plate, and the limiting supporting plate may be partially attached to the first limiting combination plate.

The above method is also applicable to other embodiments and is not described herein again.

Therefore, the present invention discloses a portable bracket, which comprises: a first supporting plate, a second supporting plate, and a supporting body arranged between the first supporting plate and the second supporting plate, wherein the supporting body can be switched between an unfolding state and a folding state, when the supporting body is in the unfolding state, the first supporting plate is fixed on the second supporting plate at a predetermined included angle, and when the supporting body is in the folding state, the first supporting plate is attached to the second supporting plate. In the present invention, both the first supporting plate and the second supporting plate support a mobile device, and a size of the predetermined included angle may be adjusted and set. When the predetermined included angle is 85° to 90°, a field of view of the supported mobile device is wide; therefore, users conveniently perform live broadcast activity. The present invention further has the characteristics of a small volume and convenient carrying.

The above mentioned contents are merely embodiments of the present invention and are not intended to limit the patent scope of the present invention. The equivalent structural transformations made by using the contents of the specification and the drawings of the present invention, or direct or indirect applications to other related technical fields, are all included in the patent protection scope of the present invention.

The invention claimed is:

1. Portable bracket, comprising: a first supporting plate, a second supporting plate, and a supporting body arranged between the first supporting plate and the second supporting plate, wherein the supporting body can be switched between an unfolding state and a folding state, when the supporting body is in the unfolding state, the first supporting plate is fixed on the second supporting plate at a predetermined included angle, and when the supporting body is in the folding state, the first supporting plate is attached to the second supporting plate;

and wherein the supporting body comprises an angle adjusting plate, the angle adjusting plate comprises a first adjusting combination plate connected to the first supporting plate, a second adjusting combination plate connected to the second supporting plate, and an adjusting supporting plate connected to the first adjusting combination plate and the second adjusting combination plate by a folding part at each connection, and the adjusting supporting plate is supported between the first supporting plate and the second supporting plate;

and wherein the supporting body further comprises an angle limiting plate, the angle limiting plate comprises a first limiting combination plate connected to the first supporting plate, a second limiting combination plate connected to the second supporting plate, and a limiting supporting plate connected to the first limiting combination plate and the second limiting combination plate by a folding part at each connection, and the limiting supporting plate is attached to the first limiting combination plate;
and
the first support plate has an inner side and an outer side, and the second support plate has an inner side and an outer side, when the supporting body is in the folding state, the first supporting plate is attached to the second supporting plate, and the inner side of the first support plate is in contact with the inner side of the second support plate, and the outer side of the first support plate is away from the outer side of the second support plate;
a connection position between the first adjusting combination plate and the first supporting plate is at a left edge of the inner side surface of the first supporting plate, and a connection position between the second adjusting combination plate and the second supporting plate is at a right edge of an inner side surface of the second supporting plate,
the adjusting supporting plate between the first adjusting combination plate and the second adjusting combination plate can be turned over by a folding part;
and
when the left edge of the first supporting plate moves to a left edge of the inner side surface of the second supporting plate, the predetermined included angle becomes smaller, and when the left edge of the first supporting plate moves to a right edge of the inner side surface of the second supporting plate,
the predetermined included angle becomes larger,
a range of the predetermined included angle is 0° to 90°, when the predetermined included angle is 0°, the first supporting plate and the second supporting plate are attracted, and when the predetermined included angle is 90°, the first supporting plate is approximately vertical to the second supporting plate.

2. The portable bracket according to claim 1, wherein the supporting body comprises one angle adjusting plate and one angle limiting plate.

3. The portable bracket according to claim 1, wherein the supporting body comprises two angle adjusting plates and one angle limiting plate, and the angle limiting plate is positioned between the two angle adjusting plates.

4. The portable bracket according to claim 1, wherein a surface of the first supporting plate and a surface of the second supporting plate are wrapped with protective films.

5. The portable bracket according to claim 2, wherein a surface of the angle adjusting plate and a surface of the angle limiting plate are wrapped with protective films.

6. The portable bracket according to claim 5, wherein the angle limiting plate is magnetic.

7. The portable bracket according to claim 6, wherein the predetermined included angle is 85° to 90°.

8. The portable bracket according to claim 7, wherein both the first supporting plate and the second supporting plate are in a square, rectangular, or circular shape.

9. A portable bracket, comprising: a first supporting plate, a second supporting plate, and a supporting body arranged between the first supporting plate and the second supporting plate, wherein the supporting body can be switched between an unfolding state and a folding state, when the supporting body is in the unfolding state, the first supporting plate is fixed on the second supporting plate at a predetermined included angle, when the supporting body is in the folding state, the first supporting plate is attached to the second supporting plate, the supporting body comprises one angle adjusting plate and two angle limiting plates, and the angle adjusting plate is positioned between the two angle limiting plates;
and
wherein the angle adjusting plate comprises a first adjusting combination plate connected to the first supporting plate, a second adjusting combination plate connected to the second supporting plate, and an adjusting supporting plate connected to the first adjusting combination plate and the second adjusting combination plate by a folding part at each connection, and the adjusting supporting plate is supported between the first supporting plate and the second supporting plate;
and
wherein the angle limiting plate comprises a first limiting combination plate connected to the first supporting plate, a second limiting combination plate connected to the second supporting plate, and a limiting supporting plate connected to the first limiting combination plate and the second limiting combination plate by a folding part at each connection, and the limiting supporting plate is attached to the first limiting combination plate;
and
the first support plate has an inner side and an outer side, and the second support plate has an inner side and an outer side, when the supporting body is in the folding state, the first supporting plate is attached to the second supporting plate, and the inner side of the first support plate is in contact with the inner side of the second support plate, and the outer side of the first support plate is away from the outer side of the second support plate;
a connection position between the first adjusting combination plate and the first supporting plate is at a left edge of the inner side surface of the first supporting plate, and a connection position between the second adjusting combination plate and the second supporting plate is at a right edge of an inner side surface of the second supporting plate,
the adjusting supporting plate between the first adjusting combination plate and the second adjusting combination plate can be turned over by a folding part;
and
when the left edge of the first supporting plate moves to a left edge of the inner side surface of the second supporting plate, the predetermined included angle becomes smaller, and when the left edge of the first supporting plate moves to a right edge of the inner side surface of the second supporting plate, the predetermined included angle becomes larger,
a range of the predetermined included angle is 0° to 90°, when the predetermined included angle is 0°, the first supporting plate and the second supporting plate are attracted, and when the predetermined included angle is 90°, the first supporting plate is approximately vertical to the second supporting plate.

10. The portable bracket according to claim 9, wherein the first adjusting combination plate and the first limiting combination plate are integrally connected.

11. The portable bracket according to claim 10, wherein the second adjusting combination plate and the second limiting combination plate are integrally connected.

12. The portable bracket according to claim 11, wherein a length of the limiting supporting plate is the same as that of the first limiting combination plate,
and the limiting supporting plate is completely attached to the first limiting combination plate.

13. The portable bracket according to claim 11, wherein a length of the limiting supporting plate is greater than that of the first limiting combination plate, and the limiting supporting plate is partially attached to the first limiting combination plate.

14. The portable bracket according to claim 12, wherein a surface of the angle adjusting plate and a surface of the angle limiting plate are wrapped with protective films.

15. He portable bracket according to claim 14, wherein the angle limiting plate is magnetic.

16. The portable bracket according to claim 15, wherein the predetermined included angle is 85° to 90°.

\* \* \* \* \*